United States Patent
Nishitani et al.

(10) Patent No.: US 12,334,504 B2
(45) Date of Patent: Jun. 17, 2025

(54) NONAQUEOUS ELECTROLYTE SECONDARY BATTERY

(71) Applicant: Panasonic Intellectual Property Management Co., Ltd., Osaka (JP)

(72) Inventors: Satoshi Nishitani, Osaka Fu (JP); Masaki Deguchi, Hyogo Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 604 days.

(21) Appl. No.: 17/634,477

(22) PCT Filed: Jul. 3, 2020

(86) PCT No.: PCT/JP2020/026125
§ 371 (c)(1),
(2) Date: Feb. 10, 2022

(87) PCT Pub. No.: WO2021/039119
PCT Pub. Date: Mar. 4, 2021

(65) Prior Publication Data
US 2022/0294017 A1    Sep. 15, 2022

(30) Foreign Application Priority Data
Aug. 30, 2019 (JP) ................. 2019-158956

(51) Int. Cl.
*H01M 10/00* (2006.01)
*H01M 4/36* (2006.01)
(Continued)

(52) U.S. Cl.
CPC ....... *H01M 10/0569* (2013.01); *H01M 4/364* (2013.01); *H01M 4/386* (2013.01);
(Continued)

(58) Field of Classification Search
CPC ...... H01M 10/0569; H01M 4/36; H01M 4/38; H01M 4/525; H01M 4/505; H01M 4/58; H01M 10/0525; H01M 10/0568
See application file for complete search history.

(56) References Cited

U.S. PATENT DOCUMENTS

2005/0221180 A1    10/2005    Shimura et al.
2010/0018034 A1    1/2010    Miyasaka et al.
(Continued)

FOREIGN PATENT DOCUMENTS

CN    108232099 A    6/2018
CN    108352562 A    7/2018
(Continued)

OTHER PUBLICATIONS

Extended (Supplementary) European Search Report dated Nov. 21, 2022, issued in counterpart EP application No. 20857073.9. (9 pages).
(Continued)

*Primary Examiner* — Anca Eoff
*Assistant Examiner* — Monique M Wills
(74) *Attorney, Agent, or Firm* — WHDA, LLP

(57) ABSTRACT

A nonaqueous electrolyte secondary battery includes a positive electrode, a negative electrode, and a nonaqueous electrolyte. The positive electrode includes a positive electrode material including particles of a composite oxide containing lithium and a metal Me other than lithium, and a tungsten compound attached to a surface of the particles. The metal Me contains at least nickel. The nonaqueous electrolyte includes an unsaturated sultone compound.

9 Claims, 1 Drawing Sheet

(51) Int. Cl.
  *H01M 4/38* (2006.01)
  *H01M 4/485* (2010.01)
  *H01M 4/505* (2010.01)
  *H01M 4/525* (2010.01)
  *H01M 4/58* (2010.01)
  *H01M 10/0525* (2010.01)
  *H01M 10/0568* (2010.01)
  *H01M 10/0569* (2010.01)
  *H01M 4/02* (2006.01)

(52) U.S. Cl.
  CPC ........... *H01M 4/485* (2013.01); *H01M 4/505* (2013.01); *H01M 4/525* (2013.01); *H01M 4/5825* (2013.01); *H01M 10/0525* (2013.01); *H01M 10/0568* (2013.01); *H01M 2004/027* (2013.01); *H01M 2004/028* (2013.01); *H01M 2300/0028* (2013.01)

(56) References Cited

U.S. PATENT DOCUMENTS

| | | |
|---|---|---|
| 2010/0068613 A1 | 3/2010 | Deguchi |
| 2012/0034516 A1 | 2/2012 | Koo et al. |
| 2014/0134461 A1 | 5/2014 | Inoue et al. |
| 2016/0190646 A1 | 6/2016 | Kim et al. |
| 2017/0317380 A1 | 11/2017 | Takijiri et al. |
| 2018/0026305 A1 | 1/2018 | Takada et al. |
| 2018/0183097 A1* | 6/2018 | Yamazaki ......... H01M 10/0569 |
| 2018/0183111 A1 | 6/2018 | Tsubouchi et al. |
| 2018/0309116 A1 | 10/2018 | Goto et al. |
| 2018/0337403 A1 | 11/2018 | Komukai et al. |
| 2019/0115588 A1 | 4/2019 | Matsuhara et al. |
| 2019/0207246 A1 | 7/2019 | Dahn et al. |
| 2019/0233388 A1* | 8/2019 | Amine ................ H01M 10/052 |

FOREIGN PATENT DOCUMENTS

| | | |
|---|---|---|
| CN | 109686926 A | 4/2019 |
| EP | 3662532 A1 | 6/2020 |
| JP | 2012-508444 A | 4/2012 |
| JP | 2013-125732 A | 6/2013 |
| JP | 2013-239466 A | 11/2013 |
| WO | 2009/057232 A1 | 5/2009 |
| WO | 2016/017092 A | 2/2016 |
| WO | 2016/017092 A1 | 2/2016 |
| WO | 2017/209895 A1 | 12/2017 |
| WO | 2019/025980 A1 | 2/2019 |
| WO | 2019/066297 A2 | 4/2019 |

OTHER PUBLICATIONS

Office Action dated Feb. 9, 2024 issued in counterpart CN application No. 202080059280.7 with partical English translation. (12 pages).

International Search Report dated Sep. 15, 2020, issued in counterpart International Application No. PCT/JP2020/026125, with English Translation. (5 pages).

* cited by examiner

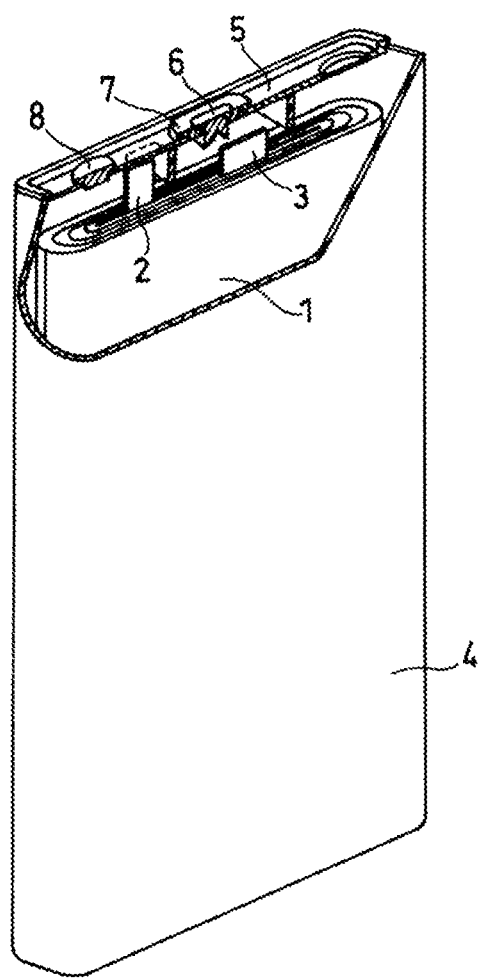

NONAQUEOUS ELECTROLYTE SECONDARY BATTERY

TECHNICAL FIELD

The present invention relates to nonaqueous electrolyte secondary batteries.

BACKGROUND ART

Nonaqueous electrolyte secondary batteries represented by lithium ion secondary batteries are used as a power source of a vehicle such as an electric vehicle, and is required to improve the capacity and output characteristics. In the positive electrode active material of the nonaqueous electrolyte secondary battery, for example, a composite oxide containing lithium and nickel (hereinafter, also referred to as a nickel-based composite oxide) is used.

PTL 1 has proposed the following positive active material for nonaqueous electrolyte secondary batteries. The positive electrode active material includes a powder of a lithium-metal composite oxide represented by general formula: $Li_zNi_{1-x-y}Co_xM_yO_2$. In the formula, $0.10 \leq x \leq 0.35$, $0 \leq y \leq 0.35$, $0.97 \leq z \leq 1.20$ are satisfied, and M is at least one element selected from the group consisting of Mn, V, Mg, Mo, Nb, Ti, and Al. The powder of the lithium-metal composite oxide contains primary particles and secondary particles formed by aggregated primary particles, and fine particles of lithium tungstate are disposed on the surface of the primary particles. $Li_2WO_4$, $Li_4WO_5$, or $Li_6W_2O_9$ is used for lithium tungstate.

PTL 2 has proposed the following nonaqueous electrolyte secondary batteries. The nonaqueous electrolyte secondary battery includes a positive electrode containing particles of a lithium transition metal composite oxide, a negative electrode containing a carbon material capable of inserting and desorbing lithium ions, and a nonaqueous electrolyte. The lithium transition metal composite oxide contains nickel as a main component of all metal elements except lithium. The particles of the lithium transition metal composite oxide include primary particles and secondary particles formed by aggregated primary particles, and a tungsten compound is attached to a surface of at least one of the primary particles and the secondary particles. The nonaqueous electrolyte includes a cyclic carbonate and a chain carbonate, and the volume ratio of the chain carbonate to the cyclic carbonate is 3 or more and less than 9.

CITATION LIST

Patent Literature

[PTL 1] JP-A-2013-125732
[PTL 2] WO2016/017092

SUMMARY OF INVENTION

Nickel-based composite oxide is advantageous for high capacity, but the positive electrode resistance increases, and the DC resistance of the battery is likely to increase. When the lithium tungstate described in Patent Document 1 or the tungsten compound described in PTL 2 is attached on the surfaces of the nickel-based complex oxide particles, the initial DC resistance becomes small to some extent. However, repeated charging and discharging may increase the DC resistance and reduce the output characteristics.

In view of the above, one aspect of the present invention relates to a nonaqueous electrolyte secondary battery containing a positive electrode, a negative electrode, and a nonaqueous electrolyte, wherein the positive electrode includes a positive electrode material including particles of a composite oxide containing lithium and a metal Me other than lithium, and a tungsten compound attached to a surface of the particles, the metal Me includes at least nickel, and the nonaqueous electrolyte includes an unsaturated sultone compound.

According to the present invention, it is possible to provide a nonaqueous electrolyte secondary battery having high capacity and excellent output characteristics.

BRIEF DESCRIPTION DRAWINGS

FIG. 1 is a schematic perspective view, partially cut away, of a nonaqueous electrolyte secondary battery in one embodiment of the present invention.

DESCRIPTION OF EMBODIMENTS

A nonaqueous electrolyte secondary battery according to an embodiment of the present invention includes a positive electrode, a negative electrode, and a nonaqueous electrolyte. The positive electrode includes a positive electrode material containing particles of a composite oxide (active material) containing lithium and a metal Me other than lithium, and a tungsten compound attached to the surface of the particles described above. The metal Me contains at least nickel. Nonaqueous electrolytes include an unsaturated sultone compound. Note that "attached" described above includes a case where the tungsten compound and the particles of the composite oxide are in contact with each other in the positive electrode mixture layer.

By attaching a tungsten compound to the surface of the particles of the nickel-based composite oxide, which is advantageous for increasing the capacity, and by including the unsaturated sultone compound in the nonaqueous electrolyte, the increase in DC resistance due to the repetition of charge and discharge in the case of using the nickel-based composite oxide is greatly suppressed.

The reasons in detail are unclear, but it is assumed as follows.

At the time of charging and discharging, a film containing a component derived from an unsaturated sultone compound may be formed on the surface of the composite oxide particles to which the tungsten compound is attached. The film has low resistance and good lithium ion conductivity. Further, the above film has effects of protecting the composite oxide particles described above, and at the time of charging and discharging, elution of the tungsten compound into the electrolyte is suppressed by the above film, and the effect of reducing the DC resistance by the tungsten compound is easily maintained.

An unsaturated sultone compound is a cyclic sulfonic acid ester having a carbon-carbon unsaturated bond within the ring. In the unsaturated sultone compound, a good quality film having an action of protecting a composite oxide is easily formed due to the presence of an unsaturated bond as compared with a saturated sultone compound, and elution of a tungsten compound into an electrolyte is suppressed.

Examples of the unsaturated sultone compound include a compound represented by the following general formula (1):

[Chemical formula 1]

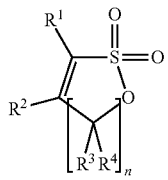

(1)

$R^1$ to $R^4$ in general formula (1) are each independently a hydrogen atom or a substituent. The substituent includes a halogen atom, a hydrocarbon group, a hydroxyl group, an amino group, and an ester group. The halogen atom includes a fluorine atom, a chlorine atom, and the like. The hydrocarbon group includes an alkyl group and an alkenyl group. The alkyl group and the alkenyl group may be linear or branched. The alkyl group includes a methyl group, an ethyl group, a n-propyl group, an isopropyl group, and the like. The alkenyl group includes a vinyl group, a 1-propenyl group, a 2-propenyl group, and the like. At least one of the hydrogen atoms of the hydrocarbon group may be substituted with a halogen atom. In view of ensuring good viscosity and improving solubility of the nonaqueous electrolyte, the hydrocarbon group is preferably an alkyl group having 1 to 5 carbon atoms, and more preferably an alkyl group having 1 to 3 carbon atoms.

In Formula (1), "n" represents the repeating number of methylene groups having $R^3$ and $R^4$. "n" is an integer of 1 to 3. When "n" is 2 or 3, $R^3$ and $R^4$ of each methylene group may be the same or different.

Specific Examples of the compound represented by general formula (1) include 1-propene-1,3-sulton (PRS), 1-butene-1,4-sulton, 1-pentene-1,5-sulton, 2-fluoro-1-propene-1,3-sulton, 2-fluoro-1-butene-1,4-sulton, and 2-fluoro-1-pentene-1,5-sulton. In view of the particularly significant effect of suppressing an increase in DC resistance due to repeat of charging and discharging, PRS is preferable among them.

The unsaturated sultone compound content in the nonaqueous electrolyte (mass ratio to the entire nonaqueous electrolyte) is preferably 1.5% by mass or less, more preferably 0.1% by mass or more and 1.5% by mass or less, and still more preferably 0.2% by mass or more and 1.5% by mass or less. It is preferable that the unsaturated sultone compound content in the nonaqueous electrolyte is within the above-described range prior to the initial charge of the battery (or prior to injection into the battery). When the unsaturated sultone compound content in the nonaqueous electrolyte is 1.5% by mass or less, the film is easily formed suitably, and the film resistance is easily reduced. When the unsaturated sultone compound content in the nonaqueous electrolyte is 0.1% by mass or more, a film derived from an unsaturated sultone compound tends to be sufficiently formed. The sultone compound content in the nonaqueous electrolyte is determined by, for example, gas chromatography-mass spectrometry (GCMS).

During the course of charge and discharge, at least a portion of the unsaturated sultone compound decomposes and is utilized for film formation. Therefore, in a battery after charging and discharging (for example, an initial battery after performing charging and discharging several times), the unsaturated sultone compound content in the nonaqueous electrolyte may be less than 1.5 mass %. When the unsaturated sultone compound content at the time of preparation of the nonaqueous electrolyte is 1.5% by mass or less, for example, the unsaturated sultone compound content in the nonaqueous electrolyte in the battery after the first charge is 50 ppm or less. The unsaturated sultone compound content in the nonaqueous electrolyte taken out from the battery may be a trace amount close to the detection limit. If the presence of unsaturated sultone compounds can be confirmed, a corresponding effect is observed.

In the case where the nonaqueous electrolyte contains methyl acetate (MA), the effect of suppressing the increase of the DC resistance due to the repetition of the charge and discharge by the additive of the unsaturated sultone compound is remarkably obtained. When the nonaqueous electrolyte contains MA, although the resistance becomes small, the tungsten compound tends to elute into the electrolyte. Therefore, in this case, the effect of suppressing the elution of the tungsten compound into the electrolyte by the addition of the unsaturated sultone compound is remarkably obtained. The MA content in the nonaqueous electrolyte is, for example, 5 mass % or more and 90 mass % or less.

The tungsten compound includes at least one of tungsten oxide and lithium tungstate. Examples of the tungsten oxide include $WO_3$. Examples of the lithium tungstate include $Li_2WO_4$.

In the positive electrode material, an atomic ratio of tungsten contained in the tungsten compound to the metal Me: W/Me is preferably 0.01 or more and 0.5 or less, more preferably 0.05 or more and 0.5 or less, and still more preferably 0.05 or more and 0.2 or less. When W/Me is 0.01 or more, the tungsten compound is sufficiently present on the surfaces of the composite oxide particles, and the effect of suppressing the increase of the DC resistance due to the repetition of charging and discharging is easily obtained. When W/Me is 0.5 or less, a composite oxide (positive electrode active material) is sufficiently present in the positive electrode material, which tends to increase the capacity.

The atomic ratio W/Me can be determined, for example, by the following process.

The battery is disassembled and the positive electrode is removed. The positive electrode is washed with a nonaqueous solvent, and the nonaqueous electrolyte attached to the positive electrode is removed, and the nonaqueous solvent is removed by drying. A positive electrode mixture is collected from the positive electrode and made into a solution with a predetermined acid to obtain a sample solution. Using the obtained sample solution, the amount of W and the amount of Me in the sample solution are determined by inductively coupled plasma (ICP) emission spectrometry, and the atomic ratio W/Me is calculated.

Examples of a method of attaching a tungsten compound to the surface of the composite oxide particles include a method of mixing a composite oxide and a tungsten compound and heating the mixture. In the above method, it is easy to attach a tungsten compound to the surface of both the primary particles and the secondary particles of the composite oxide.

The tungsten compound attached to the surface of the composite oxide particles can be confirmed by the observation of the cross section of the composite oxide particles (including deposits on the particle surface) in the positive electrode mixture layer by a scanning electron microscope (SEM), and analyzing elements in the cross section of the particles by energy dispersive X-ray spectroscopy (EDX).

The positive electrode active material includes a composite oxide containing lithium and a metal Me other than lithium, and the metal Me contains at least nickel (Ni). As a result, a high capacity battery is obtained. The metal Me may further include at least one selected from the group consisting of cobalt (Co), manganese (Mn), aluminum (Al), magnesium (Mg), calcium (Ca), iron (Fe), copper (Cu), zinc (Zn), chromium (Cr), titanium (Ti), niobium (Nb), zirconium (Zr), vanadium (V), tantalum (Ta), molybdenum (Mo), strontium (Sr), and silicon (Si). In addition to the metal Me, the composite oxide may further include boron (B).

In view of increasing the capacity and improving the output characteristics, among others, the metal Me preferably contains Ni and at least one selected from the group consisting of Co, Mn, and Al, and more preferably contains Ni, Co, and Mn and/or Al. When the metal Me contains Co, the phase transition of the composite oxide containing lithium and nickel is suppressed during charge and discharge, the stability of the crystal structure is improved, and the cycle characteristics are easily improved. When the metal Me contains Mn and/or Al, the thermal stability is improved.

In view of easily increasing the capacity, in the composite oxide, an atomic ratio: Ni/Me of nickel to metal Me is preferably 0.45 or more and less than 1, more preferably 0.50 or more and less than 1, and still more preferably 0.75 or more and less than 1.

The composite oxide may be an oxide represented by general formula: $Li_aNi_xM_{1-x}O_2$ ($0.9 \leq a \leq 1.2$, $0.45 \leq x < 1$, M is at least one selected from the group consisting of Co, Mn, and Al). When "a" indicating the composition ratio of Li is 0.95 or more and 1.2 or less, cation mixing in which Ni ions enter the Li site is difficult to occur, and the output characteristics are easily improved. When "x" indicating the composition ratio of Ni is 0.45 or more and less than 1, the ratio of Ni in the metal Me is large, the capacity is easily increased, and the effect of Ni and the effect of M are obtained in a well-balanced manner. The value of "a" changes during charging and discharging.

The composite oxide may be an oxide represented by general formula $Li_aNi_xCo_yAl_zO_2$ ($0.95 \leq a \leq 1.2$, $0.8 \leq x < 1$, $0 \leq y < 0.2$, $0 \leq z \leq 0.05$, $x+y+z=1$). When "y" indicating the composition ratio of Co is more than 0 and less than 0.2, it is easy to maintain a high capacity and a high output, and it is easy to improve the stability of the crystal structure at the time of charge and discharge. When "z" indicating the Al composition ratio is more than 0 and 0.05 or less, it is easy to maintain a high capacity and a high output, and it is easy to improve the thermal stability.

Particles of the composite oxide usually include secondary particles in which a plurality of primary particles are aggregated. The average particle size (D50) of the secondary particles is, for example, 5 μm or more and 20 μm or less. Here, the average particle size (D50) refers to a median diameter, i.e., volume integrated value of 50% in the volume-based particle size distribution. Average particle size of the secondary particles (D50) is determined by performing the particle size distribution measurement by the laser diffraction method. The particles of the composite oxide may contain particles composed of primary particles alone.

Hereinafter, the configuration of the nonaqueous electrolyte secondary battery will be described in detail.

(Positive Electrode)

The positive electrode includes, for example, a positive electrode current collector, and a positive electrode mixture layer formed on the surface of the positive electrode current collector. The positive electrode mixture layer can be formed by applying a positive electrode slurry containing a positive electrode mixture dispersed in a dispersion medium, onto a surface of the positive electrode current collector, and drying the slurry. The dried film may be rolled, if necessary. The positive electrode mixture layer may be formed on one surface of the positive electrode current collector, or on both surfaces thereof. The positive electrode mixture includes a positive electrode active material as an essential component, and may include a binder, a conductive agent, and a thickener, as an optional component.

Examples of the binding agent include resin materials such as fluororesin including polytetrafluoroethylene and polyvinylidene fluoride (PVDF); polyolefin resins, such as polyethylene and polypropylene; polyamide resins, such as aramid resin; polyimide resins, such as polyimide and polyamideimide; acrylic resins, such as polyacrylic acid, polymethyl acrylate, and ethylene-acrylic acid copolymers; vinyl resins, such as polyacrylonitrile and polyvinyl acetate; polyvinylpyrrolidone; polyethersulfone; rubbery materials, such as styrene-butadiene copolymer rubber (SBR). A kind of the binder may be used singly, or two or more kinds thereof may be used in combination.

Examples of the conductive agent include graphite such as natural graphite and artificial graphite; carbon blacks such as acetylene black; conductive fibers such as carbon fibers and metal fibers; carbon fluoride; powders of metal such as aluminum; conductive whiskers such as zinc oxide and potassium titanate; conductive metal oxides such as titanium oxide; and organic conductive materials such as phenylene derivatives. The conductive agent may be used singly, or two or more kinds thereof may be used in combination.

Examples of the thickener include carboxy methylcellulose (CMC) and a modified product thereof (also including salts such as Na salts), a cellulose derivative such as methylcellulose (such as cellulose ether), a saponified product of a polymer having a vinyl acetate unit such as polyvinyl alcohol, and a polyether (such as polyalkylene oxide such as polyethylene oxide). The thickener may be used singly, or two or more kinds thereof may be used in combination.

The dispersion medium is not particularly limited, but water, for example, an alcohol such as ethanol, ether such as tetrahydrofuran, an amide such as dimethylformamide, N-methyl-2-pyrrolidone (NMP), or a mixture solvent thereof is used.

For the positive electrode current collector, a non-porous conductive substrate (metal foil, etc.), a porous conductive substrate (mesh body, net body, punched sheet, etc.) is used. As the material of the positive electrode current collector, for example, stainless steel, aluminum, aluminum alloy, and titanium can be used. The thickness of the positive electrode current collector is not particularly limited, but is, for example, 3 to 50 μm.

(Negative Electrode)

The negative electrode includes, for example, a negative electrode current collector, and a negative electrode mixture layer formed on the surface of the negative electrode current collector. The negative electrode mixture layer can be formed by applying a negative electrode slurry including a negative electrode mixture dispersed in a dispersion medium, onto a surface of the negative electrode current collector, and drying the slurry. The dried film may be rolled, if necessary. The negative electrode mixture layer may be formed on one surface of the negative electrode current collector, or on both surfaces thereof. The negative electrode mixture includes a negative electrode active material as an essential component, and may include a binder, a conductive agent, and a thickener, as an optional component. As the binder, the thickener, and the dispersion medium, those given examples for the positive electrode can be used. For the conductive agent, those examples given for the positive electrode, except graphite, can be used.

Examples of the negative electrode active material include a carbon material, silicon, a silicon containing material, and a lithium alloy.

In view of increasing the capacity, it is preferable that the negative electrode active material includes an Si-based active material of at least one of silicon and a silicon-containing material. For the silicon containing material, a composite material including a silicate phase containing at least one of an alkali metal element and a Group 2 element, and silicon particles dispersed in the silicate phase can be used. In this case, the initial charge/discharge efficiency and cycle characteristics are improved. The composite material includes, for example, a lithium silicate phase and silicon particles dispersed within the lithium silicate phase. The lithium silicate phase may have a composition represented by, for example, $Li_{2u}SiO_{u+2}$ ($0<u<2$). For the silicon containing material, $SiOz$ ($0.5 \leq z \leq 1.5$) including a $SiO_2$ phase and silicon particles dispersed in the $SiO_2$ phase may be used. The surface of the particles of silicon containing material may be coated with a conductive layer containing a conductive material, such as a carbon material.

Examples of the carbon material include graphite, soft carbon, and hard carbon. Preferred among them is graphite, which is excellent in stability during charging and discharging and has small irreversible capacity. Graphite means a material having a graphite-type crystal structure, examples of which include natural graphite, artificial graphite, and graphitized mesophase carbon particles. The carbon material may be used singly or in combination of two or more.

In view of easily obtaining good cycle characteristics and high capacity in good balance, it is preferable to use an Si-based active material and a carbon material in combination. In view of increasing the capacity, the ratio of the Si-based active material to the total of the Si-based active material and the carbon material is preferably 0.5% by mass or more, more preferably 1% by mass or more, and still more preferably 2% by mass or more. In addition, in view of improving the cycle characteristics, the ratio of the Si-based active material to the total of the Si-based active material and the carbon material is preferably 30% by mass or less, more preferably 20% by mass or less, and still more preferably 15% by mass or less.

For the negative electrode current collector, a non-porous conductive substrate (metal foil, etc.), a porous conductive substrate (mesh-body, net-body, punched sheet, etc.) is used. For the material of the negative electrode current collector, stainless steel, nickel, nickel alloy, copper, and copper alloy can be used. The negative electrode current collector may have a thickness of, in view of the balance between strength and weight savings of the negative electrode, without limitation, preferably 1 to 50 μm, more preferably 5 to 20 μm.

(Nonaqueous Electrolyte)

The nonaqueous electrolyte includes a nonaqueous solvent and a lithium salt dissolved in the nonaqueous solvent. Examples of the nonaqueous solvent includes unsaturated sultone.

For the nonaqueous solvent, for example, a cyclic carbonic acid ester, a chain carbonic acid ester, a cyclic carboxylic acid ester, and a chain carboxylic acid ester may be used. Examples of the cyclic carbonic acid ester include propylene carbonate (PC), and ethylene carbonate (EC). A cyclic carbonic acid ester having an unsaturated bond such as vinylene carbonate (VC) may be used. A cyclic carbonic acid ester having a fluorine atom such as fluoroethylene carbonate (FEC) may be used. Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). Examples of the chain carboxylic acid ester include methyl formate, ethyl formate, propyl formate, methyl acetate, ethyl acetate, propyl acetate, methyl propionate, ethyl propionate, and propyl propionate. The nonaqueous solvent may be used singly, or two or more kinds thereof may be used in combination.

Examples of the lithium salt include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylate, LiCl, LiBr, LiI, boric acid salts, and imide salts. Examples of the boric acid salt include lithium bis(1,2-benzenediolate(2-)-O,O')borate, lithium bis(2,3-naphthalenediolate(2-)-O,O')borate, lithium bis(2,2'-biphenyldiolate(2-)-O,O')borate, and lithium bis(5-fluoro-2-olate-1-benzenesulfonic acid-O, O')borate. Examples of the imide salts include litium bisfluorosulfonylimide ($LiN(FSO_2)_2$), litium bistrifluoromethanesulfonyl imide ($LiN(CF_3SO_2)_2$), lithium (trifluoromethanesulfonyl)(nonafluorobutanesulfonyl)imide ($LiN(CF_3SO_2)(C_4F_9SO_2)$), and litium bispentafluoroethanesulfonyl imide ($LiN(C_2F_5SO_2)_2$). The lithium salt may be used singly, or two or more kinds thereof may be used in combination. The lithium salt concentration in the nonaqueous electrolyte is, for example, 0.5 mol/L or more and 2 mol/L or less.

(Separator)

It is generally desirable to interpose a separator between the positive electrode and the negative electrode. The separator is excellent in ion permeability and has suitable mechanical strength and electrically insulating properties. For the separator, a microporous thin film, a woven fabric, and a nonwoven fabric can be used. For the material of the separator, a polyolefin such as polypropylene or polyethylene is preferred.

Examples of the structure of the nonaqueous electrolyte secondary battery include those in which an electrode group and a nonaqueous electrolyte are housed in a housing. The electrode group is formed by winding the positive and negative electrodes with a separator interposed therebetween. Alternatively, other forms of electrode groups may be applied, such as a stack electrode group in which a positive electrode and a negative electrode are laminated with a separator interposed therebetween, instead of the wound electrode group. The nonaqueous electrolyte secondary battery may be in any form, such as cylindrical, rectangular, coin, button, and laminated.

FIG. 1 is a schematic partially cut-away view of a rectangular nonaqueous electrolyte secondary battery according to one embodiment of the invention.

The battery includes a bottomed-square battery case 4 and an electrode group 1 and a nonaqueous electrolyte (not shown) housed within the battery case 4. The electrode group 1 has a long strip-like negative electrode and a long strip-like positive electrode and a separator interposed and preventing direct contact therebetween. The electrode group 1 is formed by winding the negative electrode, the positive electrode, and the separator around a flat core and removing the core.

An end of a negative electrode lead 3 is attached to the negative electrode current collector of the negative electrode by welding. The other end portion of the negative electrode lead 3 is electrically connected to the negative electrode terminal 6 provided on a sealing plate 5 through an insulating plate (not shown) made of resin. The negative electrode terminal 6 is insulated from the sealing plate 5 by a resin-made gasket 7. An end of a positive electrode lead 2 is attached to the positive electrode current collector of the positive electrode by welding. The other end of the positive lead 2, via an insulating plate, is connected to the rear surface of the sealing plate 5. That is, the positive electrode lead 2 is electrically connected to the battery case 4 serving also as a positive electrode terminal. The insulating plate separates the electrode group 1 and the sealing plate 5 and separates the negative electrode lead 3 and the battery case 4. The periphery of the sealing plate 5 is fitted to the open end of the battery case 4, and the fitting portion is laser welded. In this way, the opening of the battery case 4 is sealed with the sealing plate 5. The injection hole of the nonaqueous electrolyte provided in the sealing plate 5 is embolized by the sealing plug 8.

EXAMPLES

The present invention will be described in detail below with reference to Examples and Comparative Examples. The present invention, however, is not limited to the following Examples.

Example 1

(1) Preparation of Positive Electrode Active Material $Ni_{0.90}Co_{0.07}Al_{0.03}(OH)_2$ obtained by the coprecipitation method and $Li_2CO_3$ were mixed so that the atomic ratio of Li to the sum of Ni, Co, and Al:Li/(Ni+Co+Al) was 1.05/1, and the mixture was fired in an oxygen-atmosphere to obtain a composite oxide as a positive electrode active material. The composition of the obtained composite oxide was $Li_{1.05}Ni_{0.90}Co_{0.07}Al_{0.03}O_2$. The composition of the composite oxide was determined by ICP emission spectrometry. A powder of the composite oxide with an average particle size of 12 µm was obtained by grinding and classifying using sieve.

(2) Preparation of the Positive Electrode Material

The powder of the composite oxide and a powder of tungsten compound (average particle size: 4 µm) were mixed so that the atomic ratio of W to the metal Me (sum of Ni, Co, and Al):W/Me was 0.09/1. The mixture obtained was heated at 200° C., to obtain a positive electrode material having a tungsten compound attached to the surface of the particles of the composite oxide. $WO_3$ was used for the tungsten compound.

SEM observation and EDX analysis confirmed that the particles of the composite oxide contained secondary particles formed by aggregation of a plurality of primary particles, and primary particles present alone, and that a tungsten compound was attached to the surface of any of the particles.

(3) Preparation of Positive Electrode

The positive electrode material, acetylene black (AB), and polyvinylidene fluoride (PVDF) were mixed at a mass ratio of 100:2:2, N-methyl-2-pyrrolidone (NMP) was added thereto, and then the mixture was stirred using a mixer (T. K. HIVIS MIX, manufactured by PRIMIX Corporation) to prepare a positive electrode slurry. The positive electrode slurry was applied to the surface of an aluminum foil, and the coating film was dried, and then rolled to prepare a positive electrode in which a positive electrode mixture layer (density 3.6 g/cm³) was formed on both surfaces of the aluminum foil.

(4) Preparation of Negative Electrode

A silicon-containing material powder (average particle size: 5 µm) and a graphite powder (average particle size: 20 µm) were mixed in a mass ratio of 5:95 to obtain a negative electrode active material. The silicon-containing material used was particles of SiOz (z=1) having a $SiO_2$ phase, silicon particles dispersed in the $SiO_2$ phase, and conductive layers on their surfaces.

The negative electrode active material, styrene-butadiene rubber (SBR), and sodium carboxy methylcellulose (CMC-Na) were mixed at a mass ratio of 100:1:1, water was added thereto, and then stirred using a mixer (T. K. HIVIS MIX, manufactured by PRIMIX Corporation) to prepare a negative electrode slurry. The negative electrode slurry was applied to the surface of a copper foil, and the coating film was dried, and then rolled to prepare a negative electrode in which a negative electrode mixture layer (density: 1.7 g/cm³) was formed on both surfaces of the copper foil.

(5) Preparation of Nonaqueous Electrolyte $LiPF_6$ was dissolved in a mixed solvent (volume ratio 1:1) of ethylene carbonate (EC) and diethyl carbonate (DEC) to prepare a nonaqueous electrolyte. In the above, 1-propen-1,3-sultone (PRS) was included as an additive in the nonaqueous electrolyte. The PRS content in the nonaqueous electrolyte was set to 1.0% by mass. The concentration of $LiPF_6$ in the nonaqueous electrolyte was set to 1.2 mol/L.

(6) Fabrication of Nonaqueous Electrolyte Secondary Battery

One end of a positive electrode lead made of aluminum was attached to the positive electrode obtained above. One end of a negative electrode lead made of nickel was attached to the negative electrode obtained above. A wound electrode body was produced by winding the positive electrode and negative electrode with a polyethylene separator interposed therebetween. The electrode body was dried under vacuum at 105° C. for 2 hours, and then housed in a bottomed cylindrical battery case serving also as a negative electrode terminal. For the battery case, an iron case (outer diameter 18 mm, height 65 mm) was used. Next, a nonaqueous electrolyte was injected into the battery case, and then the opening of the battery case was closed using a sealing body made of metal serving also as a positive electrode terminal. At this time, a resin gasket was interposed between the sealing body and the open end of the battery case. The other end of the positive electrode lead was connected to the sealing body, and the other end of the negative lead was connected to the inner bottom surface of the battery case. Thus, an 18650-type cylindrical nonaqueous electrolyte secondary battery (Battery A1 of Example 1) was produced.

Comparative Example 1

Battery B1 of Comparative Example 1 was prepared in the same manner as Battery A1, except that 1,3-propane sultone (PS) was contained in the nonaqueous electrolyte instead of PRS.

Comparative Example 2

Battery C1 of Comparative Example 2 was produced in the same manner as Battery A1, except that PRS was not included in the nonaqueous electrolyte.

Batteries A1, B1, and C1 were evaluated as follows.

[Evaluation 1: Initial (0 Cycle) DC Resistance]

For the battery obtained above, in an environment of 25° C., constant current charging was performed until the voltage reached 4.2V at a current of 0.2 C, and after the constant current charging, constant voltage charging with a voltage of 4.2V was conducted until the current reached 0.02 C. After charging, the battery was left to stand for 20 minutes. In this way, the battery of SOC100% was obtained. The obtained SOC100% battery was subjected to constant current discharging with a 0.5 C current I. Difference $\Delta V$ between the voltage immediately before the start of discharge and the voltage after 10 seconds elapsed after the start of discharge was divided by the current I to determine a value ($\Delta V/I$), and regarded as the initial (0 cycle) DC resistance $R_0$.

[Evaluation 2: DC Resistance at 200th Cycle]

The battery thus obtained was subjected to the following charge/discharge cycle test.

<Charge/Discharge Cycle Test>
<Charging>

Under the environment of 45° C., constant current charge was performed until the voltage reached 4.2V at a current of 0.5 C. After charging, the batteries were left to stand for 20 minutes.

<Discharging>

Thereafter, constant current discharging was performed at 45° C. until the voltage reached 2.5V at a current of 0.5 C.

For the battery after 200 cycles, $\Delta V/I$ was obtained in the same manner as in Evaluation 1, and regarded as a DC resistance $R_{200}$ at 200th cycle.

[Evaluation 3: DC Resistance at 500th Cycle]

The battery thus obtained was subjected to the same charge/discharge cycle test as in Evaluation 2. For the battery after 500 cycles, $\Delta V/I$ was obtained in the same manner as in Evaluation 1, and regarded as a DC resistance $R_{500}$ at 500th cycle.

[Evaluation 4: Resistance Change Rate]

Using the DC resistance $R_0$ and the DC resistance $R_{200}$ obtained above, the resistance change rate at 200th cycle was determined from the following equation.

Resistance change rate (%)=(DC resistance $R_{200}$-DC resistance $R_0$)/DC resistance $R_0 \times 100$ Using the DC resistance $R_0$ and the DC resistance $R_{500}$ obtained above, the resistance change rate at 500th cycle was determined from the following equation.

Resistance change rate (%)=(DC resistance $R_{500}$-DC resistance $R_0$)/DC resistance $R_0 \times 100$

[Evaluation 5: Resistance Increase Rate]

Resistance increase rate at 200th cycle of Battery A1 relative to Battery C1 was determined by the following equation, setting the resistance change rate at 200th cycle of Battery A1 as $A1_{200}$, and setting the resistance change rate at 200th cycle of Battery C1 as $C1_{200}$.

Resistance increase rate (%) at 200th cycle of Battery $A1=(A1_{200}/C1_{200}) \times 100$ Resistance increase rate at 500th cycle of Battery A1 relative to Battery C1 was determined by the following equation, setting the resistance change rate at 500th cycle of Battery A1 as $A1_{500}$, and setting the resistance change rate at 500th cycle of Battery C1 as $C1_{500}$.

Resistance increase rate (%) at 500th cycle of Battery $A1=(A1_{500}/C1_{500}) \times 100$ Resistance increase rate at 200th cycle of Battery B1 relative to Battery C1 was determined by the following equation, setting the resistance change rate at 200th cycle of the Battery B1 as $B1_{200}$, and setting the resistance change rate at 200th cycle of the Battery C1 as $C1_{200}$.

Resistance increase rate (%) at 200th cycle of Battery $B1=(B1_{200}/C1_{200}) \times 100$ Resistance increase rate at 500th cycle of Battery B1 relative to Battery C1 was determined by the following equation, setting the resistance change rate at 500th cycle of Battery B1 as $B1_{500}$, and setting the resistance change rate at 500th cycle of Battery C1 as $C1_{500}$.

Resistance increase rate (%) at 500th cycle of Battery $B1=(B1_{500}/C1_{500}) \times 100$ Comparative Examples 3 to 5

Batteries A2, B2, and C2 of Comparative Examples 3 to 5 were prepared and evaluated in the same manner as Batteries A1, B1, and C1, except that no tungsten compound was deposited on the surface of the composite oxide particles.

Example 2 and Comparative Examples 6-7

PRS and methyl acetate (MA) were added as additives to the nonaqueous electrolyte. Specifically, EC, DEC, and MA were mixed in a volume ratio of 25:60:15 to obtain a mixed solvent. $LiPF_6$ was dissolved in the mixed solvent to prepare a nonaqueous electrolyte. PRS was included in the nonaqueous electrolyte. The PRS content in the nonaqueous electrolyte was set to 1.0% by mass. The concentration of $LiPF_6$ in the nonaqueous electrolyte was set to 1.2 mol/L.

Except for the above, Battery A3 of Example 2 was produced and evaluated in the same manner as Battery A1. Batteries B3 and C3 of Comparative Examples 6 to 7 were produced and evaluated in the same manner as Batteries B1 and C1 except for the above.

The evaluation results of Batteries A1-A3, B1-B3, and C1-C3 are shown in Table 1.

TABLE 1

| | | Positive Electrode Material | | | | | | | Nonaqueous electrolyte Additive | | Evaluation | | | | | |
|---|---|---|---|---|---|---|---|---|---|---|---|---|---|---|---|---|
| | | Composite oxide composition | | | | | | Atomic | PS or PRS | | DC resistance (mΩ) | | | Resistance Change Rate(%) | | Resistance increase rate(%) |
| | | $Li_aNi_xCo_{y1}Mn_{y2}Al_{y3}$ | | | | | Tungsten | ratio | | Content | 0 | 200 | 500 | 200 | 500 | 200 | 500 |
| | Battery | a | x | y1 | y2 | y3 | compound | W/Me | Type | (mass %) | cycle | cycle | cycle | cycle | cycle | cycle | cycle |
| Comp. Ex. 5 | C2 | 1.05 | 0.90 | 0.07 | 0 | 0.03 | None | 0 | None | — | 48.4 | 68.9 | 82.4 | 42.3 | 70.2 | — | — |
| Comp. Ex. 4 | B2 | 1.05 | 0.90 | 0.07 | 0 | 0.03 | None | 0 | PS | 1.0 | 48.7 | 67.8 | 82.7 | 39.2 | 69.8 | 92.7 | 99.4 |
| Comp. Ex. 3 | A2 | 1.05 | 0.90 | 0.07 | 0 | 0.03 | None | 0 | PRS | 1.0 | 48.8 | 66.8 | 80.5 | 36.8 | 64.9 | 87.0 | 92.5 |

TABLE 1-continued

| | Battery | Positive Electrode Material | | | | | | | Nonaqueous electrolyte Additive | | Evaluation | | | | | | |
|---|---|---|---|---|---|---|---|---|---|---|---|---|---|---|---|---|---|
| | | Composite oxide composition | | | | | Tungsten compound | Atomic ratio W/Me | PS or PRS | | DC resistance (mΩ) | | | Resistance Change Rate(%) | | Resistance increase rate(%) | |
| | | $Li_aNi_xCo_{y1}Mn_{y2}Al_{y3}$ | | | | | | | | | | | | | | | |
| | | a | x | y1 | y2 | y3 | | | Type | Content (mass %) | 0 cycle | 200 cycle | 500 cycle | 200 cycle | 500 cycle | 200 cycle | 500 cycle |
| Comp. Ex. 2 | C1 | 1.05 | 0.90 | 0.07 | 0 | 0.03 | $WO_3$ | 0.09/1 | None | — | 37.3 | 51.4 | 60.9 | 37.8 | 63.4 | — | — |
| Comp. Ex. 1 | B1 | 1.05 | 0.90 | 0.07 | 0 | 0.03 | $WO_3$ | 0.09/1 | PS | 1.0 | 37.1 | 47.6 | 57.6 | 28.3 | 55.2 | 74.9 | 87.1 |
| Ex. 1 | A1 | 1.05 | 0.90 | 0.07 | 0 | 0.03 | $WO_3$ | 0.09/1 | PRS | 1.0 | 38.3 | 45.7 | 55.2 | 19.3 | 44.1 | 51.6 | 69.6 |
| Comp. Ex. 7 | C3 | 1.05 | 0.90 | 0.07 | 0 | 0.03 | $WO_3$ | 0.09/1 | MA | — | 33.9 | 50.3 | 61.1 | 48.5 | 80.1 | — | — |
| Comp. Ex. 6 | B3 | 1.05 | 0.90 | 0.07 | 0 | 0.03 | $WO_3$ | 0.09/1 | PS + MA | 1.0 | 34.0 | 45.0 | 56.6 | 32.5 | 66.5 | 67.1 | 83.0 |
| Ex. 2 | A3 | 1.05 | 0.90 | 0.07 | 0 | 0.03 | $WO_3$ | 0.09/1 | PRS + MA | 1.0 | 34.1 | 41.1 | 51.2 | 20.4 | 50.0 | 42.1 | 62.4 |

In Battery A1 of Example 1 in which a tungsten compound was attached to the surface of the nickel-based composite oxide particles and PRS was included in the nonaqueous electrolyte, the resistance change rates at 200th cycle and 500th cycle were small. In Battery B1 of Comparative Example 1 and Battery C1 of Comparative Example 2, a tungsten compound was attached to the surface of the nickel-based composite oxide particles, but the nonaqueous electrolyte contained no unsaturated sultone compound, and therefore the resistance change rates at 200th cycle and 500th cycle increased. In Battery A1 containing PRS in the nonaqueous electrolyte, the resistance increase rates relative to Battery C1 at 200th cycle and 500th cycle were significantly smaller than in Battery B1 containing PS in the nonaqueous electrolyte. In Battery A1, as compared with the Batteries B1 and C1, the effect of suppressing the increase in resistance due to repetition of charging and discharging was remarkably obtained.

In Battery A3 of Example 2 in which PRS and MA were included in the nonaqueous electrolyte, the effect of suppressing the increase in resistance due to repetition of charging and discharging was more remarkably obtained.

In Battery A2 of Comparative Example 3, PRS was contained in the nonaqueous electrolyte, but since the tungsten compound was not attached to the surface of the nickel-based composite oxide particles, the resistance change rate increased.

In Battery B2 of Comparative Example 4 and Battery C2 of Comparative Example 5, since PRS was not contained in the nonaqueous electrolyte and no tungsten compound was attached to the surface of the nickel-based composite oxide particles, the resistance change rate was increased.

In Battery B3 of Comparative Example 6 and the Battery C3 of Comparative Example 7, a tungsten compound was attached to the surface of the nickel-based composite oxide particles, but since the unsaturated sultone compound was not contained in the nonaqueous electrolyte, the resistance change rate increased.

Examples 3 to 5

Batteries D1-D3 of Examples 3-5 were prepared in the same manner as Battery A1, except that the PRS content in the nonaqueous electrolyte was changed to the values shown in Table 2. Batteries D1-D3 were subjected to the evaluations 1 to 4. The evaluation results of Batteries D1 to D3 together with Battery A1 are shown in Table 2.

TABLE 2

| | Battery | Positive Electrode Material | | | | | | | Nonaqueous electrolyte Additive | | Evaluation | | | | |
|---|---|---|---|---|---|---|---|---|---|---|---|---|---|---|---|
| | | Composite oxide composition | | | | | Tungsten compound | Atomic ratio W/Me | | | DC resistance (mΩ) | | | Resistance Change Rate(%) | |
| | | $Li_aNi_xCo_{y1}Mn_{y2}Al_{y3}$ | | | | | | | | | | | | | |
| | | a | x | y1 | y2 | y3 | | | Type | Content (mass %) | 0 cycle | 200 cycle | 500 cycle | 200 cycle | 500 cycle |
| Ex. 3 | D1 | 1.05 | 0.90 | 0.07 | 0 | 0.03 | $WO_3$ | 0.09/1 | PRS | 0.2 | 37.9 | 45.5 | 55.7 | 20.1 | 47.0 |
| Ex. 4 | D2 | 1.05 | 0.90 | 0.07 | 0 | 0.03 | $WO_3$ | 0.09/1 | PRS | 0.8 | 38.2 | 45.7 | 55.5 | 19.6 | 45.2 |
| Ex. 1 | A1 | 1.05 | 0.90 | 0.07 | 0 | 0.03 | $WO_3$ | 0.09/1 | PRS | 1.0 | 38.3 | 45.7 | 55.2 | 19.3 | 44.1 |
| Ex. 5 | D3 | 1.05 | 0.90 | 0.07 | 0 | 0.03 | $WO_3$ | 0.09/1 | PRS | 1.5 | 38.9 | 45.9 | 55.5 | 18.0 | 42.7 |

The resistance change rate was small in Batteries D1 to D3 of Examples 3 to 5 and Battery A1 of Example 1 in which the PRS content in the nonaqueous electrolyte was 0.2% by mass or more and 1.5% by mass or less. Above all, in Batteries A1, D2, and D3 in which the PRS content in the nonaqueous electrolyte was 0.8% by mass or more and 1.5% by mass or less, the resistance change rate was smaller.

Example 6

Battery E1 of Example 6 was prepared in the same manner as Battery A1, except that $Li_2WO_4$ was used instead of $WO_3$ as the tungsten compound. Battery E1 was subjected to the evaluations 1 to 4. The evaluation results of Battery E1 and Battery A1 are shown in Table 3.

TABLE 3

| | | Positive Electrode Material | | | | | | Nonaqueous electrolyte Additive | | Evaluation | | | | |
| | | Composite oxide composition | | | | | Atomic | | | DC resistance (mΩ) | | | Resistance Change Rate(%) | |
| | | $Li_aNi_xCo_{y1}Mn_{y2}Al_{y3}$ | | | | | Tungsten | ratio | | Content | 0 | 200 | 500 | 200 | 500 |
| | Battery | a | x | y1 | y2 | y3 | compound | W/Me | Type | (mass %) | cycle | cycle | cycle | cycle | cycle |
| Ex. 1 | A1 | 1.05 | 0.90 | 0.07 | 0 | 0.03 | $WO_3$ | 0.09/1 | PRS | 1.0 | 38.3 | 45.7 | 55.2 | 19.3 | 44.1 |
| Ex. 6 | E1 | 1.05 | 0.90 | 0.07 | 0 | 0.03 | $Li_2WO_4$ | 0.09/1 | PRS | 1.0 | 38.4 | 45.9 | 55.3 | 19.5 | 44.0 |

Even in Battery E1, similarly to Battery A1, the resistance change rate was small.

Examples 7 to 9

Batteries F1 to F3 of Examples 7 to 9 were prepared in the same manner as Battery A1, except that the blending ratio of the composite oxide and the tungsten compound was adjusted and the atomic ratio W/Me was changed to the values shown in Table 4 in the preparation of the positive electrode materials. Batteries F1-F3 were subjected to the evaluations 1, 2, and 4. The evaluation results of Batteries F1 to F3 together with Batteries A1 and A2 are shown in Table 4.

Examples 10 to 12

Batteries G1-G3 of Examples 11-13 were prepared in the same manner as Battery A1, except that x, y1, y2, and y3, which represent the composition ratio of the metals Me (Ni, Co, Mn, and Al), were changed to the values shown in Table 5 in the preparation of the composite oxide.

Batteries G1 to G3 were subjected to the evaluations 1, 2, and 4.

Batteries A1 and G1 to G3 were subjected to the evaluation 6.

[Evaluation 6: Initial Capacity]

The battery obtained as described above was subjected to the following charging and discharging, and the initial capacity was determined.

<Charging>

In an environment of 25° C., constant current charging was performed until the voltage reached 4.2V at a current of 0.2 C, and then constant voltage charging was performed until the current reached 0.02 C at the voltage of 4.2V. After charging, the batteries were left to stand for 20 minutes.

<Discharging>

Thereafter, in an environment of 25° C., constant current discharge was performed until the voltage reached 2.5V at a

TABLE 4

| | | Positive Electrode Material | | | | | | | Nonaqueous electrolyte Additive | | Evaluation | | | |
| | | Composite oxide composition | | | | | | Atomic | | | DC resistance (mΩ) | | Resistance Change Rate(%) |
| | | $Li_aNi_xCo_{y1}Mn_{y2}Al_{y3}$ | | | | | Tungsten | ratio | | Content | 0 | 200 | 200 |
| | Battery | a | x | y1 | y2 | y3 | compound | W/Me | Type | (mass %) | cycle | cycle | cycle |
| Comp. Ex. 3 | A2 | 1.05 | 0.90 | 0.07 | 0 | 0.03 | None | 0 | PRS | 1.0 | 48.8 | 66.8 | 36.8 |
| Ex. 7 | F1 | 1.05 | 0.90 | 0.07 | 0 | 0.03 | $WO_3$ | 0.02/1 | PRS | 1.0 | 42.2 | 54.9 | 30.1 |
| Ex. 8 | F2 | 1.05 | 0.90 | 0.07 | 0 | 0.03 | $WO_3$ | 0.05/1 | PRS | 1.0 | 41.4 | 51.7 | 24.9 |
| Ex. 1 | A1 | 1.05 | 0.90 | 0.07 | 0 | 0.03 | $WO_3$ | 0.09/1 | PRS | 1.0 | 38.3 | 45.7 | 19.3 |
| Ex. 9 | F3 | 1.05 | 0.90 | 0.07 | 0 | 0.03 | $WO_3$ | 0.20/1 | PRS | 1.0 | 37.8 | 45.1 | 19.3 |

Battery A1 of Example 1 and Batteries F1 to F3 of Examples 7 to 9 having a W/Me of 0.01 or more and 0.5 or less all had a resistance change rate smaller than that of Battery A2 of Comparative Example 3 in which no tungsten compound was used. Among them, in Batteries A1, F2, and F3 having a W/Me of 0.05 or more and 0.2 or less, the resistance change rate was smaller.

current of 0.2 C, and the initial discharge capacity (initial capacity) was obtained.

The initial capacity is expressed as an index in which the initial capacity of Battery A1 of Example 1 is 100.

The evaluation results of Batteries A1 and G1 to G3 are shown in Table 5.

TABLE 5

| | | Positive Electrode Material | | | | | | Nonaqueous electrolyte Additive | | Evaluation | | | |
| | | Composite oxide composition | | | | | Atomic | | | Initial | DC resistance (mΩ) | | Resistance Change Rate(%) |
| | | $Li_aNi_xCo_{y1}Mn_{y2}Al_{y3}$ | | | | Tungsten | ratio | | Content | Capacity | 0 | 200 | 200 |
| | Battery | a | x | y1 | y2 | y3 | compound | W/Me | Type | (mass %) | (index) | cycle | cycle | cycle |
|---|---|---|---|---|---|---|---|---|---|---|---|---|---|---|
| Ex. 1 | A1 | 1.05 | 0.90 | 0.07 | 0 | 0.03 | $WO_3$ | 0.09/1 | PRS | 1.0 | 100 | 38.3 | 45.7 | 19.3 |
| Ex. 10 | G1 | 1.05 | 0.60 | 0.20 | 0.16 | 0.04 | $WO_3$ | 0.09/1 | PRS | 1.0 | 96 | 35.2 | 43.5 | 23.6 |
| Ex. 11 | G2 | 1.05 | 0.50 | 0.25 | 0.26 | 0.04 | $WO_3$ | 0.09/1 | PRS | 1.0 | 96 | 36.7 | 44.8 | 22.1 |
| Ex. 12 | G3 | 1.05 | 0.45 | 0.35 | 0.17 | 0.03 | $WO_3$ | 0.09/1 | PRS | 1.0 | 88 | 33.5 | 44.1 | 31.6 |

Batteries A1 of Example 1 and G1 to G3 of Examples 10 to 12, in which x was 0.45 or more, all had high initial capacity and a small resistance change rate.

Among them, in Batteries A1, G1, and G2 having x of 0.50 or more, the resistance change rate was small and a higher initial capacity was obtained.

INDUSTRIAL APPLICABILITY

The nonaqueous electrolyte secondary battery according to the present invention is suitably used as a power source of a vehicle such as an electric vehicle.

DESCRIPTION OF REFERENCE NUMERALS

1 Electrode group
2 Positive electrode lead
3 Negative electrode lead
4 Battery case
5 Sealing plate
6 Negative electrode terminal
7 Gasket
8 Sealing cap

The invention claimed is:

1. A nonaqueous electrolyte secondary battery comprising a positive electrode, a negative electrode, and a nonaqueous electrolyte, wherein
the positive electrode includes a positive electrode material including particles of a composite oxide containing lithium and a metal Me other than lithium, and a tungsten compound attached to a surface of the particles,
the metal Me contains at least nickel,
an atomic ratio: Ni/Me of nickel to metal Me is 0.45 or more and less than 1, and
the nonaqueous electrolyte includes an unsaturated sultone compound.

2. The nonaqueous electrolyte secondary battery according to claim 1, wherein the unsaturated sultone compound includes 1-propene-1,3-sultone.

3. The nonaqueous electrolyte secondary battery according to claim 1, wherein the unsaturated sultone compound content in the nonaqueous electrolyte is 1.5% by mass or less.

4. The nonaqueous electrolyte secondary battery according to claim 1, wherein the nonaqueous electrolyte includes methyl acetate.

5. The nonaqueous electrolyte secondary battery according to claim 1, wherein the tungsten compound includes at least one of tungsten oxide and lithium tungstate.

6. The nonaqueous electrolyte secondary battery according to claim 1, wherein in the positive electrode material, an atomic ratio of tungsten contained in the tungsten compound relative to the metal Me: W/Me is 0.01 or more and 0.5 or less.

7. The nonaqueous electrolyte secondary battery according to claim 1, wherein in the composite oxide, an atomic ratio of nickel to the metal Me:Ni/Me is 0.75 or more and less than 1.

8. The nonaqueous electrolyte secondary battery according to claim 1,
wherein the composite oxide is represented by the following general formula: $Li_aNi_xM_{1-x}O_2$,
"a" and "x" satisfy $0.9 \leq a \leq 1.2$ and $0.45 \leq x < 1$, respectively, and M is at least one selected from the group consisting of Co, Mn, and Al.

9. The nonaqueous electrolyte secondary battery according to claim 1, wherein the negative electrode includes at least one of silicon and a silicon-containing material.

* * * * *